UNITED STATES PATENT OFFICE.

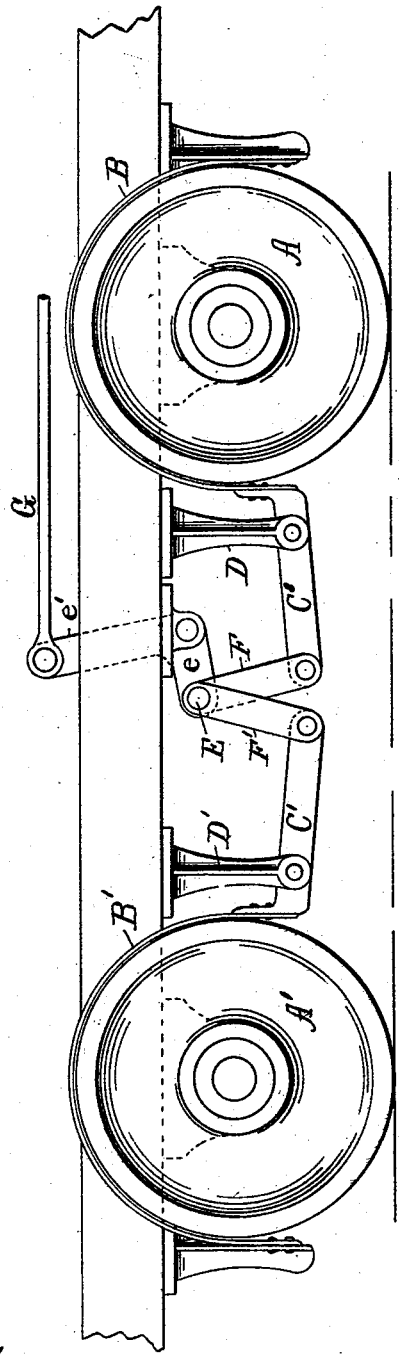

SAMUEL S. LEONARD, OF CLEVELAND, OHIO.

CAR-BRAKE.

SPECIFICATION forming part of Letters Patent No. 531,418, dated December 25, 1894.

Application filed February 3, 1894. Serial No. 499,005. (No model.)

*To all whom it may concern:*

Be it known that I, SAMUEL S. LEONARD, a citizen of the United States, residing at Cleveland, in the county of Cuyahoga and State of Ohio, have invented certain new and useful Improvements in Car-Brakes; and I do hereby declare the following to be a full, clear, and exact description of the invention, such as will enable others skilled in the art to which it appertains to make and use the same.

My invention relates to improvements in brake mechanism for cars; and it consists in the novel combination of parts hereinafter described and pointed out definitely in the claims.

In the drawing is shown a side elevation of my improved brake mechanism and the truck of a car to which it is applied.

Referring to the parts by letter, A A' represent wheels secured respectively to the front and rear axles of the car. Friction brake bands B B', made of flexible steel, lie over said wheels respectively, and in such relation thereto that they may be drawn into contact with the rims of the wheels. The front end of the band B which is provided for the front wheel is secured to a fixed point in front of the said wheel; and the rear end of the rear brake band B' is secured to a fixed point behind said wheel. The particular devices shown to which the fixed ends of the brake bands are secured are posts secured to and extending downward from the car frame. If the device is employed on a motor car, the ends of said bands may be secured to some convenient point on the motor trucks. It is not material what the ends are secured to so long as they are fixed in the described relation to the wheels. From their points of attachment the bands extend over and partly around the wheels and the mechanism for drawing said bands into contact with the wheels is applied to their adjacent movable ends. The ends of said bands are secured to the ends of the levers C C' respectively; and said levers are pivoted to the posts D D' or to some other fixed device which is located in proper relation to the wheels.

A rock shaft E is mounted in suitable bearings, and an arm $e$, which is rigidly secured to said rock shaft, is connected by means of the two links F F' to the proximate ends of the levers C C' respectively. When the rock shaft is operated so as to move the arm $e$ upward, both of the levers C C' are rocked with the result of drawing both brake bands onto and into intimate contact with the wheels A A',—the resulting friction being utilized to stop the revolution of said wheels.

The rock shaft E may be operated by pulling, in the usual way, upon the rod G which is secured to an arm $e'$ secured to said rock shaft. When the force applied to this rod is relaxed the brake bands spring away from the wheels, thereby reversing the action of the described levers.

The described mechanism may be applied to one side of the car, or to both sides as desired. In either case all of the brakes are operated by the rock shaft E, but each brake is independent of the other to this extent,—that if one be broken the other remains operative.

The wheels A A' to which the brake bands are applied may be the traction wheels of the car or they may be special brake wheels secured to the axle.

Having described my invention, I claim—

1. The combination of a car wheel, a flexible brake band fixed at one end to a suitable support adjacent to one side of the wheel and extending therefrom over and partly around said wheel, a fixed post extending down by that side of the wheel opposite to that at which the brake band is fixed, a lever pivoted to said post and connected at one end with the adjacent end of the brake band, a rock shaft, an arm secured thereto, a link connecting said arm with one end of said lever, and mechanism for operating said rock shaft, substantially as and for the purpose specified.

2. The combination of two car wheels, two brake bands fixed at their remote ends to suitable supports adjacent to said wheels respectively, and extending from said fixed points over and partly around said wheels, two levers pivoted to fixed points and connected with the movable ends of said brake bands respectively, a rock shaft, an arm secured thereto, and links connecting said arm with said two levers, and mechanism for operating said rock shaft, substantially as and for the purpose specified.

In testimony whereof I affix my signature in presence of two witnesses.

SAMUEL S. LEONARD.

Witnesses:
AUG. G. ILG,
W. H. CONNERS.